United States Patent
Grimmer et al.

(10) Patent No.: US 11,244,448 B2
(45) Date of Patent: Feb. 8, 2022

(54) METHOD AND DATA PROCESSING SYSTEM FOR PROVIDING LYMPH NODE INFORMATION

(71) Applicant: Siemens Healthcare GmbH, Erlangen (DE)

(72) Inventors: Rainer Grimmer, Erlangen (DE); Christian Tietjen, Fuerth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 86 days.

(21) Appl. No.: 16/819,288

(22) Filed: Mar. 16, 2020

(65) Prior Publication Data

US 2020/0311919 A1  Oct. 1, 2020

(30) Foreign Application Priority Data

Mar. 26, 2019 (EP) .................................... 19165247

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/11* (2017.01); *G06T 7/32* (2017.01);
(Continued)

(58) Field of Classification Search
CPC . G06T 7/0012; G06T 7/32; G06T 7/11; G06T 2207/20081; G06T 2207/20084; G06T 2207/20128; G06T 2207/30064
(Continued)

(56) References Cited

U.S. PATENT DOCUMENTS

2008/0317314 A1\* 12/2008 Schwartz ................. G06K 9/34
382/131
2009/0257635 A1  10/2009 Harvey et al.
(Continued)

FOREIGN PATENT DOCUMENTS

EP  3627443 A1  3/2020

OTHER PUBLICATIONS

Feuerstein, Marco et al: "Mediastinal atlas creation from 3-D chest computed tomography images: Application to automated detection and station mapping of lymph nodes"; Medical Image Analysis; Oxford University Press; Oxofrd, GB; vol. 16; No. 1; May 5, 2011; pp. 63-74; XP028124521; ISSN: 1361-8415; DOI: 10.1016/J.MEDIA. 2011.05.005; 2011.
(Continued)

*Primary Examiner* — Jonathan S Lee
(74) *Attorney, Agent, or Firm* — Harness, Dickey & Pierce, PLC

(57) ABSTRACT

In one embodiment, a computer-implemented method is for providing lymph node information. The method includes receiving medical imaging data; receiving atlas data spatially relating lymph node stations to at least one non-lymphatic anatomical structure; determining a lymph node position in the medical imaging data; generating the lymph node information, the lymph node information being indicative of a lymph node station, to which the lymph node position is anatomically allocated, by applying an algorithm onto the medical imaging data, the atlas data and the lymph node position; and providing the lymph node information.

23 Claims, 3 Drawing Sheets

(51) Int. Cl.
    *G06T 7/32*      (2017.01)
    *G06T 7/11*      (2017.01)
(52) U.S. Cl.
    CPC ............... *G06T 2207/20081* (2013.01); *G06T 2207/20084* (2013.01); *G06T 2207/20128* (2013.01); *G06T 2207/30064* (2013.01)
(58) Field of Classification Search
    USPC ........................................................ 382/128
    See application file for complete search history.

(56) References Cited

U.S. PATENT DOCUMENTS

| | | | |
|---|---|---|---|
| 2011/0007954 A1 | 1/2011 | Suehling et al. | |
| 2011/0222751 A1* | 9/2011 | Barbu | G06T 7/143 382/131 |
| 2019/0304098 A1* | 10/2019 | Chen | G06K 9/627 |
| 2020/0193594 A1* | 6/2020 | Georgescu | G06T 7/0012 |

OTHER PUBLICATIONS

Extended European Search Report dated Jul. 16, 2019.

* cited by examiner

METHOD AND DATA PROCESSING SYSTEM FOR PROVIDING LYMPH NODE INFORMATION

PRIORITY STATEMENT

The present application hereby claims priority under 35 U.S.C. § 119 to European patent application number EP 19165247.8 filed Mar. 26, 2019, the entire contents of which are hereby incorporated herein by reference.

FIELD

At least one embodiment of the invention generally relates to a method for providing lymph node information. In further embodiments, the invention generally relates to a data processing system for providing lymph node information, a medical imaging device, a computer program product and a computer-readable medium.

BACKGROUND

For a successful therapy of malignant tumors, a correct assessment of the tumor extent and therewith the grade and malignancy of the tumor is crucial. This is in clinical routine done with the TNM staging method which consist of rating of the tumor (T in TNM), the identification of the affected lymph nodes (N in TNM) and whether there are distant metastases (M in TNM) given or not.

The identification of the affected lymph nodes is important, as malignant tumors most likely first spread via the lymphatic system and in the flow direction of the lymphatic system. The assessment of lymph nodes brings special and significant challenges for the radiologist during reading of the images of the patient. For reporting, the correct label of the lymph node station, to which a given lymph node is anatomically allocated, must be documented.

A lymph node station is categorized by the rough anatomical region in which it is located. Anatomical regions regarding lymph nodes are, for example, cervical, mediastinal or axillary region. The lymph node stations of a given anatomical region are further classified by dedicated classifications specific to that anatomical region.

The correct labelling in the report is crucial as further steps like biopsies or surgical removal of these lymph nodes or whole lymph node stations might depend on it. In clinical practice, whole lymph node station might be removed in case one of its lymph nodes is regarded as malignant. For each lymph node station, different sizes of lymph nodes are regarded as normal. For example, lymph nodes in cervical region are regarded as normal to a diameter of 10 mm, in iliac region a diameter up to 20 mm is still normal.

In conventional lymph node assessment, the radiologist scrolls through the axial images and searches for lymph nodes which are potentially interesting. Then the radiologist brings the lymph nodes in relation to the anatomical region and looks up the name of the lymph node station manually in available literature.

SUMMARY

An embodiment of the invention is directed to facilitating an improved assessment of a lymph node in respect of the lymph node station, to which the lymph node is anatomically allocated. The claims are related to further aspects and embodiments of the invention.

In one embodiment the invention relates to a computer-implemented method for providing lymph node information, the method comprising
  receiving medical imaging data,
  receiving atlas data spatially relating lymph node stations to at least one non-lymphatic anatomical structure,
  determining a lymph node position in the medical imaging data,
  generating the lymph node information, the lymph node information being indicative of a lymph node station, to which the lymph node position is anatomically allocated, by applying an algorithm onto the medical imaging data, the atlas data and the lymph node position, and
  providing the lymph node information.

In one embodiment the invention relates to a data processing system for providing lymph node information, comprising
  a medical imaging data receiver for receiving medical imaging data,
  an atlas data receiver for receiving atlas data spatially relating lymph node stations to at least one non-lymphatic anatomical structure,
  a lymph node position determiner for determining a lymph node position in the medical imaging data,
  a lymph node information generator for generating the lymph node information, the lymph node information being indicative of a lymph node station, to which the lymph node position is anatomically allocated, by applying an algorithm onto the medical imaging data, the atlas data and the lymph node position, and
  a lymph node information provider for providing the lymph node information.

In another embodiment the data processing system is configured to implement the method according to one or more of the disclosed embodiments.

In another embodiment, the data processing system is a data processing system for providing lymph node information, comprising:
  at least one receiver, configured to receive medical imaging data and receive atlas data spatially relating lymph node stations to at least one non-lymphatic anatomical structure; and
  at least one processor configured to
    determine a lymph node position in the medical imaging data,
    generate the lymph node information, the lymph node information being indicative of a lymph node station, and anatomically allocate the lymph node position to the lymph node information by applying an algorithm onto the medical imaging data, the atlas data and the lymph node position, and
    provide the lymph node information generated.

In one embodiment, the invention relates to a medical imaging device comprising a data processing system for providing lymph node information according to one or more of the disclosed embodiments. The medical imaging device may be, for example, a computed tomography (CT) device or a magnetic resonance imaging (MRI) device or a combination of different medical imaging modalities, for example, a PET-CT-imaging device.

In one embodiment the invention relates to a computer program product comprising program elements which induce a data processing system to carry out the steps of the method according to one or more of the disclosed embodiments, when the program elements are loaded into a memory of the data processing system.

In one embodiment the invention relates to a computer-readable medium on which program elements are stored that can be read and executed by a data processing system, in order to perform the steps of the method according to one or more of the disclosed embodiments, when the program elements are executed by the data processing system.

In one embodiment the invention relates to a non-transitory computer program product storing program elements, to induce a data processing system to carry out the method of an embodiment, upon the program elements being loaded into a memory and executed by the data processing system.

In another embodiment the invention relates to a non-transitory computer-readable medium storing program elements, readable and executable by a data processing system, to perform the method of an embodiment, upon the program elements being executed by the data processing system.

BRIEF DESCRIPTION OF THE DRAWINGS

The invention will be illustrated below with reference to the accompanying figures using example embodiments. The illustration in the figures is schematic and highly simplified and not necessarily to scale.

DETAILED DESCRIPTION OF THE EXAMPLE EMBODIMENTS

Figure 1:
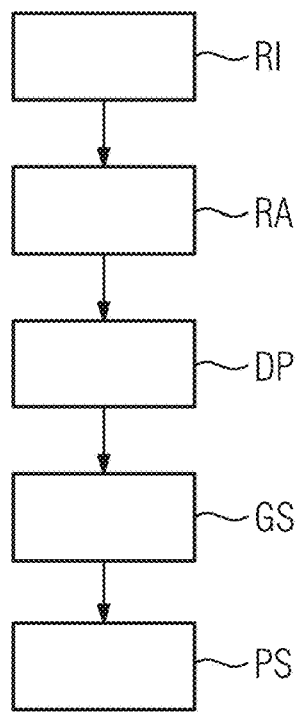
FIG. 1 shows a diagram illustrating a computer-implemented method for providing lymph node information.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In one embodiment the invention relates to a computer-implemented method for providing lymph node information, the method comprising
  receiving medical imaging data,
  receiving atlas data spatially relating lymph node stations to at least one non-lymphatic anatomical structure,
  determining a lymph node position in the medical imaging data,
  generating the lymph node information, the lymph node information being indicative of a lymph node station, to which the lymph node position is anatomically allocated, by applying an algorithm onto the medical imaging data, the atlas data and the lymph node position, and
  providing the lymph node information.

The medical imaging data can be, for example, computed tomography data or magnetic resonance imaging data or a combination thereof. In particular, the medical imaging data can be three-dimensional and/or related to a volume. The volume can be a part of a patient body. In particular, the volume can comprise at least one lymph node. The volume may furthermore comprise, for example, at least one non-lymphatic anatomical structure, in particular, in the region of the at least one lymph node comprised in the volume.

The lymph node position can be determined, for example, based on a human interaction indicating the lymph node position and/or by applying a lymph node position detection algorithm onto the medical imaging data. The human interaction indicating the lymph node position may comprise, for example, pointing to the lymph node position on a screen that displays at least a portion of the medical imaging data.

The atlas data may comprise a map of anatomical regions. An anatomical region in which the lymph node position is located may be calculated by applying the algorithm onto the medical imaging data, the atlas data and the lymph node position. The lymph node information may be calculated based on the anatomical region in which the lymph node position is located.

The lymph node station, to which the lymph node is anatomically allocated, can be determined, for example, by selecting the lymph node station, to which the lymph node is anatomically allocated, out of a plurality of lymph node stations that are specific to the anatomical region in which the lymph node position is located, for example based on a lymph node classification that is specific to that anatomical region.

The lymph node information may comprise, for example, a label of the lymph node station and/or a representation of a border of the lymph node station. The label of the lymph node station may comprise, for example, an anatomical name of the lymph node station and/or a name of the anatomical region in which the lymph node position is located. The label of the lymph node station may be displayed, for example, in a medical image, in particular at the location of the lymph node station. This allows improvement of medical image reading quality and efficiency. In particular, a lower amount of time is needed to report lymph nodes correctly.

The lymph node information may comprise information regarding the lymph node station, to which the lymph node position is anatomically allocated, and/or regarding one or more lymph nodes of the lymph node station. The lymph node information can be generated and/or provided fully automatically. The lymph node information may be provided, for example, to a clinical reporting system.

In another embodiment the method further comprises
generating a non-lymphatic anatomical structure representation of the at least one non-lymphatic anatomical structure in the medical imaging data,
calculating a correlation of the atlas data and the medical imaging data based on the non-lymphatic anatomical structure representation,
wherein the lymph node information is generated based on the correlation of the atlas data and the medical imaging data.

The non-lymphatic anatomical structure can be determined, for example, based on a human interaction indicating the non-lymphatic anatomical structure and/or by applying a non-lymphatic anatomical structure detection algorithm onto the medical imaging data. The human interaction indicating the non-lymphatic anatomical structure may comprise, for example, pointing to the non-lymphatic anatomical structure on a screen that displays at least a portion of the medical imaging data. In particular, the non-lymphatic anatomical structure may be located in a region and/or a surrounding of the lymph node position.

Based on the non-lymphatic anatomical structure representation, the atlas data can be brought into relation to the medical imaging data. The correlation of the atlas data and the medical imaging data can be calculated, for example, by applying a registration algorithm, in particular a non-rigid registration algorithm, onto the medical imaging data, the atlas data and the non-lymphatic anatomical structure representation. The algorithm that is applied onto the medical imaging data, the atlas data and the lymph node position for generating the lymph node information may comprise the non-lymphatic anatomical structure detection algorithm and/or the registration algorithm.

The correlation of the atlas data and the medical imaging data may comprise a transformation. Based on this transformation, for example the atlas data can be transformed to obtain transformed atlas data, wherein a representation of the at least one non-lymphatic anatomical structure in the transformed atlas data and the non-lymphatic anatomical structure representation in the medical image overlap, in particular overlap essentially congruently. Based on the representation of a lymph node station in the transformed atlas data, a location of that lymph node station in the medical imaging data and/or a representation of a border of that lymph node station in the medical imaging data can be determined. This allows a mapping of the locations of the lymph node stations and/or the borders of the lymph node stations to the medical imaging data.

In another embodiment the at least one non-lymphatic anatomical structure is selected from the group consisting of a bone structure, a vessel structure, a tissue structure, an organ structure and combinations thereof.

The non-lymphatic anatomical structure may comprise bone and/or tissue. The non-lymphatic anatomical structure may be a combined structure comprising at least two different structures selected from the group consisting of a bone structure, a vessel structure, a tissue structure, an organ structure and combinations thereof. For example, the non-lymphatic anatomical structure may be a combined structure comprising a vessel structure in form of an aortic arch and an organ structure in form of a trachea. The vessel structure can be, for example, an arterial blood vessel structure, comprising one or more arteries, or a venous blood vessel structure, comprising one or more veins.

The bone structure may comprise one or more bones or a part of a bone. The vessel structure may comprise one or more vessels or a part of a vessel. The tissue structure may comprise one or more tissues or a part of a tissue. The organ structure may comprise one or more organs or a part of an organ. An organ may be, for example, a heart, a liver or a lung.

In another embodiment the algorithm is a trained machine learning algorithm. The trained machine learning algorithm can be trained based on databases comprising medical imaging data and corresponding lymph node information, obtained, for example, in previous assessments of other patients. The machine learning algorithm can be trained, for example, based on correspondences between non-lymphatic anatomical structures in the medical imaging data as training input and the location of lymph node stations and/or lymph nodes as training output for different patient anatomies.

The atlas data spatially relating lymph node stations to at least one non-lymphatic anatomical structure may be implicitly comprised in the trained machine learning algorithm. Therefore, the atlas data may be provided as an implicit part of the trained machine learning algorithm.

The trained machine learning algorithm can be based, for example, on at least one of support vector machines, Bayesian classifiers, k-means clustering, decision trees, convolutional neural networks, deep belief networks, deep residual learning, reinforcement learning, recurrent neural networks and inductive programming, or on a combination thereof.

In another embodiment the method further comprises generating a representation of the lymph node station, to which the lymph node position is anatomically allocated.

The representation of the lymph node station, to which the lymph node position is anatomically allocated, can be implemented, for example in form of a contour line representing the border of the lymph node station and/or in form of an area highlighted by hatching and/or coloring. The representation of the lymph node station may comprise, for each lymph node comprised in the lymph node station, a marker indicating a position of the corresponding lymph node.

In another embodiment the method further comprises
calculating a segmentation of at least one lymph node comprised in the lymph node station, to which the lymph node position is anatomically allocated, based on the medical imaging data, receiving at least one structural threshold value that is specific to the lymph node station, to which the lymph node position is anatomically allocated, and calculating a structural comparison result based on the segmentation of the at least one lymph node and the at least one structural threshold value.

Based on the segmentation of the at least one lymph node, further details about the at least one lymph node, in particular an extent of the at least one lymph node and/or a value related to the structure of the at least one lymph node, may be determined. Based on the segmentation of the at least one lymph node at least one structural value of the at least one lymph node may be calculated. The at least one structural value may be selected from the group consisting of a size value, a density value and a texture value. The size value of a lymph node may be, for example, a diameter, a radius or a volume.

The at least one structural value may be compared to the at least one structural threshold value, thereby obtaining the structural comparison result. Based on a comparison result regarding the size of a given lymph node, a warning can be generated, in particular if the diameter exceeds the corresponding diameter threshold value. Based on a comparison result regarding the density and/or the texture of a given lymph node, for example, a necrosis of that lymph node can be detected.

In another embodiment the method further comprises calculating functional information of at least one lymph node comprised in the lymph node station, to which the lymph node position is anatomically allocated, based on the medical imaging data, receiving at least one functional threshold value that is specific to the lymph node station, to which the lymph node position is anatomically allocated, and calculating a functional comparison result based on the functional information of the at least one lymph node and the at least one functional threshold value.

The medical imaging data may comprise imaging data of one imaging modality or of at least two different imaging modalities. For example, the medical imaging data may comprise computed tomography imaging data and positron emission tomography imaging data. The functional imaging data may be, for example, positron emission tomography (PET) imaging data and/or single-photon emission computed tomography (SPECT) imaging data.

Based on the segmentation of the at least one lymph node at least one functional value of the at least one lymph node may be calculated. The at least one structural value may be an uptake value, for example, a standardized uptake value (SUV), in particular a maximum standardized uptake value (SUVMax). Based on the functional comparison, a malignancy probability of the at least one lymph node can be detected.

In another embodiment the at least one structural threshold value is selected from the group consisting of a size threshold value, a density threshold value and a texture threshold value. In another embodiment the at least one functional threshold value is an uptake threshold value, for example, a standardized uptake threshold value, in particular, a maximum standardized uptake value.

In another embodiment the method further comprises generating a lymph node marking of the at least one lymph node based on the structural comparison result of the at least one lymph node and/or the functional comparison result of the at least one lymph node.

The lymph node marking of the at least one lymph node may be generated, for example, by applying a lymph node marking algorithm to the medical imaging data and to at least one of the structural comparison result and the functional comparison result.

The lymph node marking may be indicative of the structural comparison result and/or the functional comparison result, in particular using labeling and/or color coding. This allows highlighting of suspicious lymph nodes based on regional information of the lymph node station comprising the suspicious lymph nodes. The lymph node marking may comprise a representation of the at least one lymph node. The lymph node marking may comprise a label and/or a color-coded information, for example overlapping the representation of the at least one lymph node.

For each lymph node of a plurality of lymph nodes of the lymph node station, to which the lymph node position is anatomically allocated, a structural comparison result may be calculated based on a segmentation of that lymph node and the at least one structural threshold value that is specific to the lymph node station and/or a functional comparison result may be calculated based on the functional information of the at least one lymph node and the at least one functional threshold value that is specific to the lymph node station.

A lymph node marking may be generated for each lymph node of the plurality of lymph nodes based on the structural comparison result of that lymph node and/or the functional comparison result of that lymph node.

In another embodiment the method further comprises determining a region of resection of the lymph node station, to which the lymph node position is anatomically allocated, based on the structural comparison result of the at least one lymph node and/or the functional comparison result of the at least one lymph node and/or generating a resection information based on the region of resection.

The region of resection may comprise one or more abnormal lymph nodes. The resection information may comprise at least one image comprising the region of resection and/or a resection recommendation, for example, as input for a chirurgical assessment. A resection recommendation may be generated in form of a representation of the region of resection of the lymph node station. The lymph node information may comprise the lymph node marking and/or a resection information and/or may be provided automatically in a chirurgic usable way to a clinical communication path. This allows to ease the information to the surgeon which lymph nodes would have to be removed.

The lymph node information may comprise, for example, at least one of the non-lymphatic anatomical structure representation, the correlation of the atlas data and the medical imaging data, the representation of the lymph node station, the segmentation of the at least one lymph node, the structural comparison result, the functional information, the functional comparison result, the lymph node marking, and the resection information.

In one embodiment the invention relates to a data processing system for providing lymph node information, comprising a medical imaging data receiver for receiving medical imaging data, an atlas data receiver for receiving atlas data spatially relating lymph node stations to at least one non-lymphatic anatomical structure, a lymph node position determiner for determining a lymph node position in the medical imaging data, a lymph node information generator for generating the lymph node information, the lymph node information being indicative of a lymph node station, to which the lymph node position is anatomically allocated, by applying an algorithm onto the medical imaging data, the atlas data and the lymph node position, and a lymph node information provider for providing the lymph node information.

In another embodiment the data processing system is configured to implement the method according to one or more of the disclosed embodiments.

In one embodiment, the invention relates to a medical imaging device comprising a data processing system for providing lymph node information according to one or more of the disclosed embodiments. The medical imaging device may be, for example, a computed tomography (CT) device or a magnetic resonance imaging (MRI) device or a combination of different medical imaging modalities, for example, a PET-CT-imaging device.

In one embodiment the invention relates to a computer program product comprising program elements which induce a data processing system to carry out the steps of the method according to one or more of the disclosed embodiments, when the program elements are loaded into a memory of the data processing system.

In one embodiment the invention relates to a computer-readable medium on which program elements are stored that can be read and executed by a data processing system, in order to perform the steps of the method according to one or more of the disclosed embodiments, when the program elements are executed by the data processing system.

Any of the components of the data processing system mentioned herein or any interface between the components of the data processing system can be embodied in form of hardware and/or software. In particular, an interface can be embodied in form of at least one of a PCI-Bus, a USB or a Firewire. In particular, a unit can comprise hardware elements and/or software elements, for example a microprocessor, a field programmable gate array (an acronym is "FPGA") or an application specific integrated circuit (an acronym is "ASIC").

The data processing system can, for example, comprise at least one of a cloud-computing system, a distributed computing system, a computer network, a computer, a tablet computer, a smartphone or the like. The data processing system can comprise hardware and/or software. The hardware can be, for example, a processor system, a memory system and combinations thereof. The hardware can be configurable by the software and/or be operable by the software. Calculations for performing a step of a method and/or for training an algorithm may be carried out in a processor.

Data, in particular, the medical imaging data, the atlas data, the structural threshold value and the functional threshold value can be received, for example, by receiving a signal that carries the data and/or by reading the data from a computer-readable medium. Data, in particular, the lymph node information, the non-lymphatic anatomical structure representation, the correlation of the atlas data and the medical imaging data, the representation of the lymph node station, the segmentation of the at least one lymph node, the structural comparison result, the functional information, the functional comparison result, the lymph node marking and the resection information can be provided, for example, by transmitting a signal that carries the data and/or by writing the data into a computer-readable medium and/or by displaying the data on a display.

The computer program product can be, for example, a computer program or comprise another element apart from the computer program. This other element can be hardware, for example a memory device, on which the computer program is stored, a hardware key for using the computer program and the like, and/or software, for example, a documentation or a software key for using the computer program. A computer-readable medium can be embodied as non-permanent main memory (e.g. random-access memory) or as permanent mass storage (e.g. hard disk, USB stick, SD card, solid state disk).

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Any of the algorithms mentioned herein can be based on one or more of the following architectures: convolutional neural networks, deep belief networks, deep residual learning, deep reinforcement learning, recurrent neural networks, Siamese networks, generative adversarial networks or autoencoders. In particular, the trained machine learning algorithm can be embodied as a deep learning algorithm and/or as a convolutional neural network.

In the context of the present invention, the expression "based on" can in particular be understood as meaning "using, inter alia". In particular, wording according to which a first feature is calculated (or generated, determined etc.) based on a second feature does not preclude the possibility of the first feature being calculated (or generated, determined etc.) based on a third feature.

Reference is made to the fact that the described methods and the described units are merely preferred example embodiments of the invention and that the invention can be varied by a person skilled in the art, without departing from the scope of the invention as it is specified by the claims.

FIG. 1 shows a diagram illustrating a computer-implemented method for providing lymph node information, the method comprising receiving RI medical imaging data, receiving RA atlas data spatially relating lymph node stations to at least one non-lymphatic anatomical structure, determining DP a lymph node position in the medical imaging data, generating GS the lymph node information, the lymph node information being indicative of a lymph node station, to which the lymph node position is anatomically allocated, by applying an algorithm onto the medical imaging data, the atlas data and the lymph node position, and providing PS the lymph node information.

Figure 2:
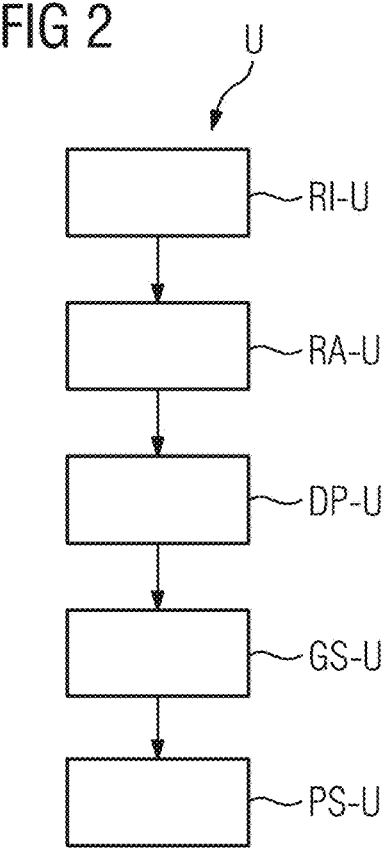
FIG. 2 shows a data processing system for providing lymph node information.

FIG. 2 shows a data processing system for providing lymph node information, comprising the following components:

a medical imaging data receiver RI-U for receiving RI medical imaging data, an atlas data receiver RA-U for receiving RA atlas data spatially relating lymph node stations to at least one non-lymphatic anatomical structure, a lymph node position determiner DP-U for determining DP a lymph node position in the medical imaging data, a lymph node information generator GS-U for generating GS the lymph node information, the lymph node information being indicative of a lymph node station, to which the lymph node position is anatomically allocated, by applying an algorithm onto the medical imaging data, the atlas data and the lymph node position, and a lymph node information provider PS-U for providing PS the lymph node information.

Figure 3:
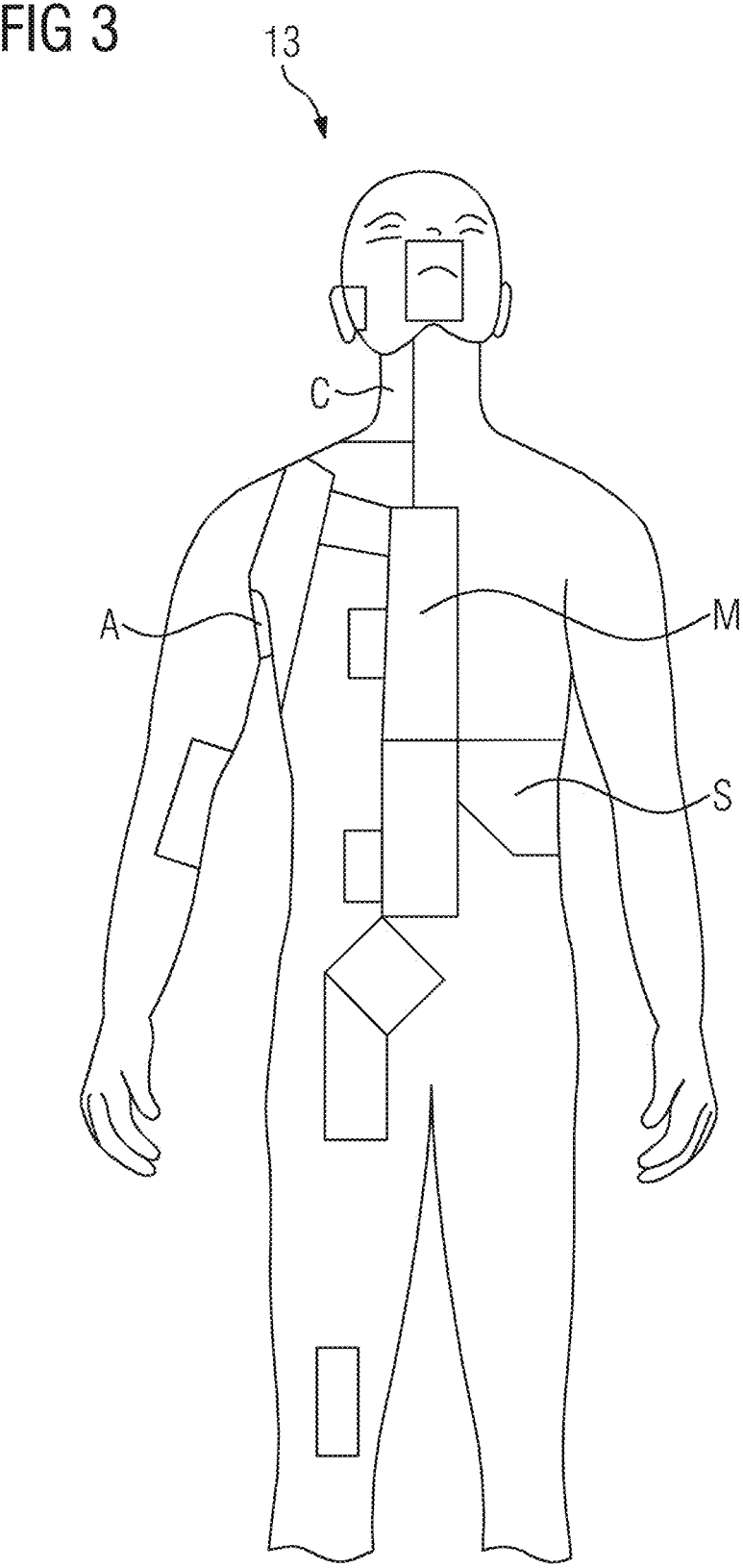
FIG. 3 shows an example of a map of anatomical regions.

FIG. 3 shows an example of a map of anatomical regions of a patient 13. Lymph node stations are categorized by the rough anatomical region, for example the cervical region C, the mediastinal region M, the axillary region A and the spleen region. For each anatomical region, the lymph node stations of that region are further classified according to a classification that is specific to that anatomical region.

Figure 4:
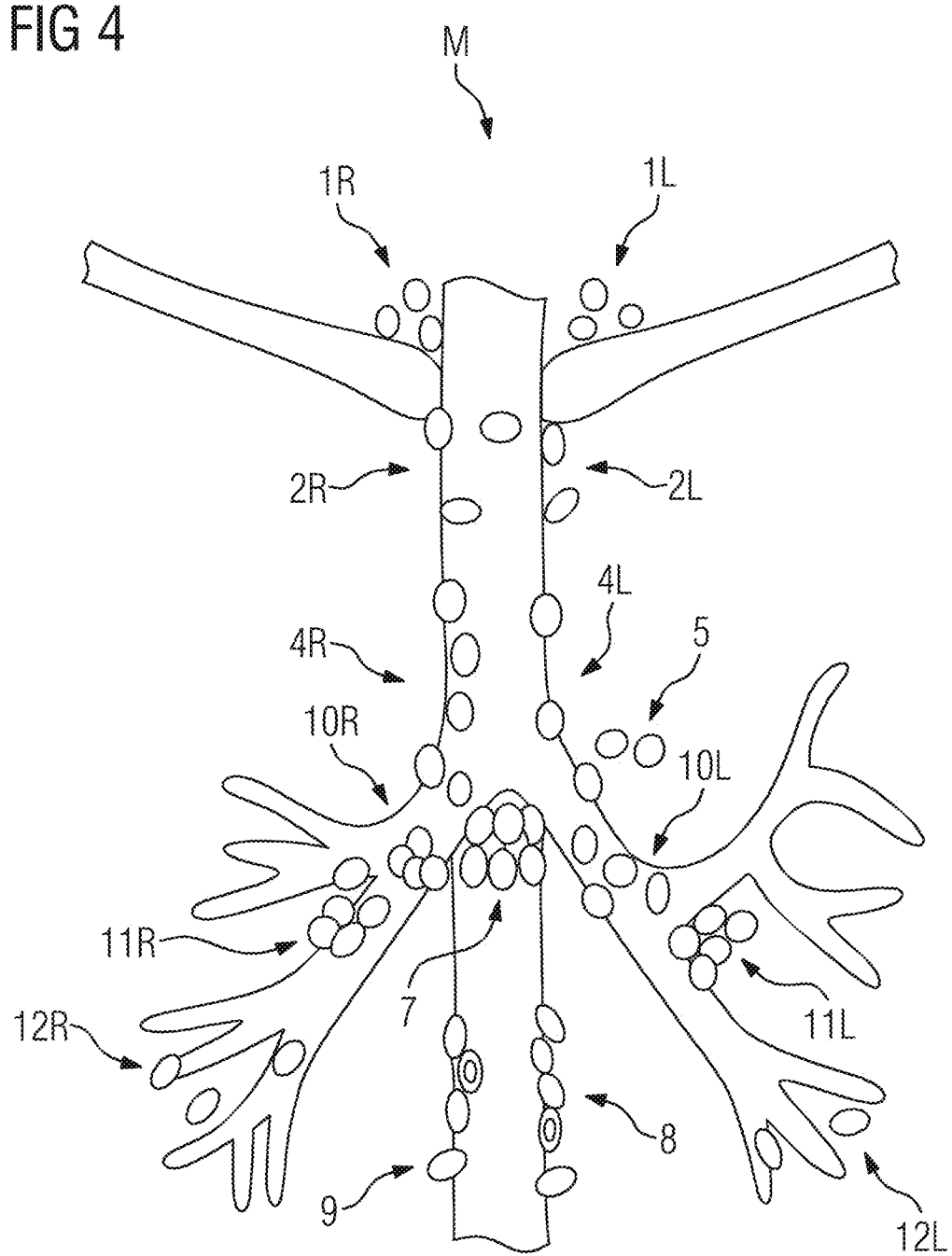
FIG. 4 shows an example of lymph node stations in the mediastinal region.

FIG. 4 shows an example of lymph node stations in the mediastinal region M, for example the low cervical, supraclavicular and sternal notch nodes 1, the right and left upper Paratracheal 2R and 2L, the right and left lower Paratracheal 4R and 4L, the Subaortic 5, the Subcarinal 7, the Paraesophageal 8, the pulmonary ligament 9, the right and left Hilar 10R and 10L, the right and left Interlobar 11R and 11L, and the right and left Lobar 12R an 12L.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing lymph node information, the method comprising:
   receiving medical imaging data;
   receiving atlas data spatially relating lymph node stations to at least one non-lymphatic anatomical structure;
   determining a lymph node position in the medical imaging data;
   generating the lymph node information, the lymph node information being indicative of a lymph node station, to which the lymph node position is anatomically allocated, by applying an algorithm onto the medical imaging data, the atlas data and the lymph node position;
   providing the lymph node information generated;
   calculating a segmentation of at least one lymph node included in the lymph node station, to which the lymph node position is anatomically allocated, based on the medical imaging data;
   receiving at least one structural threshold value specific to the lymph node station, to which the lymph node position is anatomically allocated; and
   calculating a structural comparison result based on the segmentation of the at least one lymph node and the at least one structural threshold value.

2. The computer-implemented method of claim 1, further comprising
   generating a non-lymphatic anatomical structure representation of the at least one non-lymphatic anatomical structure in the medical imaging data; and
   calculating a correlation of the atlas data and the medical imaging data based on the non-lymphatic anatomical structure representation generated,
   wherein the lymph node information is generated based on a correlation of the atlas data and the medical imaging data.

3. The computer-implemented method of claim 1, wherein the at least one non-lymphatic anatomical structure is selected from a group consisting of a bone structure, a vessel structure, a tissue structure, and an organ structure and a combination of at least two of bone structure, a vessel structure, a tissue structure, and an organ structure.

4. The computer-implemented method of claim 1, wherein the algorithm is a trained machine learning algorithm.

5. The computer-implemented method of claim 1, further comprising generating a representation of the lymph node station, to which the lymph node position is anatomically allocated.

6. A non-transitory computer program product storing program elements, to induce a data processing system to carry out the method of claim 1, upon the program elements being loaded into a memory and executed by the data processing system.

7. A non-transitory computer-readable medium storing program elements, readable and executable by a data processing system, to perform the method of claim 1, upon the program elements being executed by the data processing system.

8. A computer-implemented method for providing lymph node information, the method comprising:
   receiving medical imaging data, the medical imaging data including functional imaging data;
   receiving atlas data spatially relating lymph node stations to at least one non-lymphatic anatomical structure;
   determining a lymph node position in the medical imaging data;
   generating the lymph node information, the lymph node information being indicative of a lymph node station, to which the lymph node position is anatomically allocated, by applying an algorithm onto the medical imaging data, the atlas data and the lymph node position;
   providing the lymph node information generated;
   calculating functional information of at least one lymph node comprised in the lymph node station, to which the lymph node position is anatomically allocated, based on the medical imaging data;

receiving at least one functional threshold value specific to the lymph node station, to which the lymph node position is anatomically allocated; and calculating a functional comparison result based on the functional information of the at least one lymph node and the at least one functional threshold value.

9. The method of claim 8, further comprising:

generating a lymph node marking of the at least one lymph node based on the functional comparison result of the at least one lymph node.

10. The method of claim 8, further comprising determining a region of resection of the lymph node station, and anatomically allocating the lymph node position to the region of resection, based on the functional comparison result of the at least one lymph node, and generating a resection information based on the region of resection.

11. A non-transitory computer program product storing program elements, to induce a data processing system to carry out the method of claim 8, upon the program elements being loaded into a memory and executed by the data processing system.

12. A non-transitory computer-readable medium storing program elements, readable and executable by a data processing system, to perform the method of claim 8, upon the program elements being executed by the data processing system.

13. The computer-implemented method of claim 8, wherein the algorithm is a trained machine learning algorithm.

14. The computer-implemented method of claim 8, further comprising generating a representation of the lymph node station, to which the lymph node position is anatomically allocated.

15. The computer-implemented method of claim 1, wherein the at least one structural threshold value is selected from the group consisting of a size threshold value, a density threshold value and a texture threshold value.

16. The computer-implemented method of claim 1, further comprising:

generating a lymph node marking of the at least one lymph node based on the structural comparison result of the at least one lymph node.

17. The computer-implemented method of claim 1, further comprising determining a region of resection of the lymph node station, and anatomically allocating the lymph node position to the region of resection, based on the structural comparison result of the at least one lymph node; and generating a resection information based on the region of resection.

18. A data processing system for providing lymph node information, comprising:

at least one receiver, configured to receive medical imaging data and receive atlas data spatially relating lymph node stations to at least one non-lymphatic anatomical structure; and at least one processor configured to determine a lymph node position in the medical imaging data, generate the lymph node information, the lymph node information being indicative of a lymph node station, to which the lymph node position is anatomically allocated, by applying an algorithm onto the medical imaging data, the atlas data and the lymph node position, provide the lymph node information generated, calculate a segmentation of at least one lymph node included in the lymph node station, to which the lymph node position is anatomically allocated, based on the medical imaging data, receive at least one structural threshold value specific to the lymph node station, to which the lymph node position is anatomically allocated, and calculate a structural comparison result based on the segmentation of the at least one lymph node and the at least one structural threshold value.

19. A medical imaging device, comprising the data processing system of claim 18.

20. The data processing system of claim 18, wherein the algorithm is a trained machine learning algorithm.

21. A data processing system for providing lymph node information, comprising:

at least one receiver, configured to receive medical imaging data and receive atlas data spatially relating lymph node stations to at least one non-lymphatic anatomical structure; and at least one processor configured to determine a lymph node position in the medical imaging data, generate the lymph node information, the lymph node information being indicative of a lymph node station, to which the lymph node position is anatomically allocated, by applying an algorithm onto the medical imaging data, the atlas data and the lymph node position, provide the lymph node information generated, calculate functional information of at least one lymph node comprised in the lymph node station, to which the lymph node position is anatomically allocated, based on the medical imaging data, receive at least one functional threshold value specific to the lymph node station, to which the lymph node position is anatomically allocated, and calculate a functional comparison result based on the functional information of the at least one lymph node and the at least one functional threshold value.

22. A medical imaging device, comprising the data processing system of claim 21.

23. The data processing system of claim 21, wherein the algorithm is a trained machine learning algorithm.

* * * * *